(12) United States Patent
Lim et al.

(10) Patent No.: US 6,915,423 B2
(45) Date of Patent: Jul. 5, 2005

(54) METHOD OF PROVIDING TIME STAMPING SERVICE FOR SETTING CLIENT'S SYSTEM CLOCK

(75) Inventors: Young Sook Lim, Sungnam (KR); Kyung Hee Kang, Seoul (KR); Seung Jae Lee, Sungnam (KR)

(73) Assignee: Korea Telecom, Kyoungki-Do (KR)

( * ) Notice: Subject to any disclaimer, the term of this patent is extended or adjusted under 35 U.S.C. 154(b) by 793 days.

(21) Appl. No.: 09/774,285

(22) Filed: Jan. 30, 2001

(65) Prior Publication Data

US 2002/0062443 A1 May 23, 2002

(30) Foreign Application Priority Data

Nov. 20, 2000 (KR) ........................................ 2000-68897

(51) Int. Cl.7 ................................................. H04L 9/00
(52) U.S. Cl. ...................... 713/158; 713/156; 713/170; 713/178
(58) Field of Search ................................ 713/156–158, 713/400, 401, 500, 170, 181, 178; 705/50, 67

(56) References Cited

U.S. PATENT DOCUMENTS

| | | | | |
|---|---|---|---|---|
| 5,960,083 A | * | 9/1999 | Micali | 713/175 |
| 6,209,090 B1 | * | 3/2001 | Aisenberg et al. | 713/178 |
| 6,230,266 B1 | * | 5/2001 | Perlman et al. | 713/158 |
| 6,314,517 B1 | * | 11/2001 | Moses et al. | 713/156 |
| 6,381,696 B1 | * | 4/2002 | Doyle | 713/156 |
| 6,393,566 B1 | * | 5/2002 | Levine | 713/178 |
| 6,728,880 B1 | * | 4/2004 | Sites | 713/178 |

OTHER PUBLICATIONS

Adams et al., "Internet X.509 Public Key Infrastructure Time Stamp Protocol (TSP) <draft–ietf–pkix–time–stamp–08.txt>", Jun. 2000.*
Buldas et al., Time Stamping with Binary Linking Schemes.*

* cited by examiner

Primary Examiner—Kim Vu
Assistant Examiner—Beemnet W Dada
(74) Attorney, Agent, or Firm—Lee, Degerman, Kang & Schmadeka

(57) ABSTRACT

A method of providing a time stamping service for setting a client's system clock, wherein the client's system clock can be set to reliable standard time. Whether the client's system clock has been accurately set is one of the preconditions for the smooth provision of a public key infrastructure-based security service. A service provider providing the public key infrastructure-based security service safely receives reference time information from an objectively reliable third-party system, sets the client's system clock on the basis of the received reference time information and provides the security service on the basis of the set client's system clock. Therefore, the service provider can smoothly provide the security service while assuring the accuracy and reliability of the client's system clock. Further, the smooth provision of the security service can reduce the number of petitions from clients to the security service, thereby increasing the quality of the security service.

6 Claims, 5 Drawing Sheets

METHOD OF PROVIDING TIME STAMPING SERVICE FOR SETTING CLIENT'S SYSTEM CLOCK

BACKGROUND OF THE INVENTION

1. Field of the Invention

The present invention relates in general to an information security field, and more particularly to a method of providing a time stamping service for setting a client's system clock, wherein a service provider providing a public key infrastructure-based security service safely receives reference time information from a reliable third-party system and re-sets the client's system clock on the basis of the received reference time information, so as to assure the reliability of the client's system clock.

2. Description of the Prior Art

Recently, communication companies such as Korea Telecom have provided a public key infrastructure (PKI)-based security service together with an electronic data interchange (EDI) service for national pensions, electronic prescriptions, etc.

However, the PKI-based security service requires accuracy of time for verification of a certificate, but may not be normally provided due to time errors of a client, resulting in the leakage of incomings.

The main object of a typical time stamping service is to certify that a specific document has existed at a predetermined point of time and thus guarantee the accuracy of time.

For this reason, related documents have not referred to mechanisms for applying the time stamping service to the setting of a system clock of a client.

For the validity verification of a certificate using a certificate revocation list in connection with the public key infrastructure-based security service, there is no conclusion defined for a source of local time information as a benchmark for the validity verification and how to download the local time information from the source.

As a result, a system clock of a client employing the security service is generally used as the local time information. Provided that the system clock of the client is inaccurate, the security service will not be provided in spite of the fact that the certificate revocation list and certificate are valid.

SUMMARY OF THE INVENTION

Therefore, the present invention has been made in view of the above problems, and it is an object of the present invention to provide a method of providing a time stamping service for setting a client's system clock, which is capable of adding/defining new services to predefined time stamp specifications for the setting of the client's system clock, modifying structures of TimeStampReq and TimeStampResp messages according to the service addition/definition, receiving time information from an objectively reliable time stamp using the modified message structures, and re-setting the client's system clock on the basis of the received time information.

In accordance with the present invention, the above and other objects can be accomplished by the provision of a method of providing a time stamping service for setting a client's system clock, comprising the first step of requesting the time stamping service of a time stamp authority server by a service requester; the second step of receiving the time stamping service request from the requester and creating and sending a response message corresponding thereto by the time stamp authority server; the third step of receiving the response message sent from the time stamp authority server and verifying the integrity thereof by the requester; the fourth step of downloading a certificate revocation list from a directory server and verifying the validity thereof by the requester; and the fifth step of downloading a certificate for an electronic signature of the time stamp authority server from the directory server, verifying an electronic signature value thereof and setting the client's system clock in accordance with the verified result by the requester.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
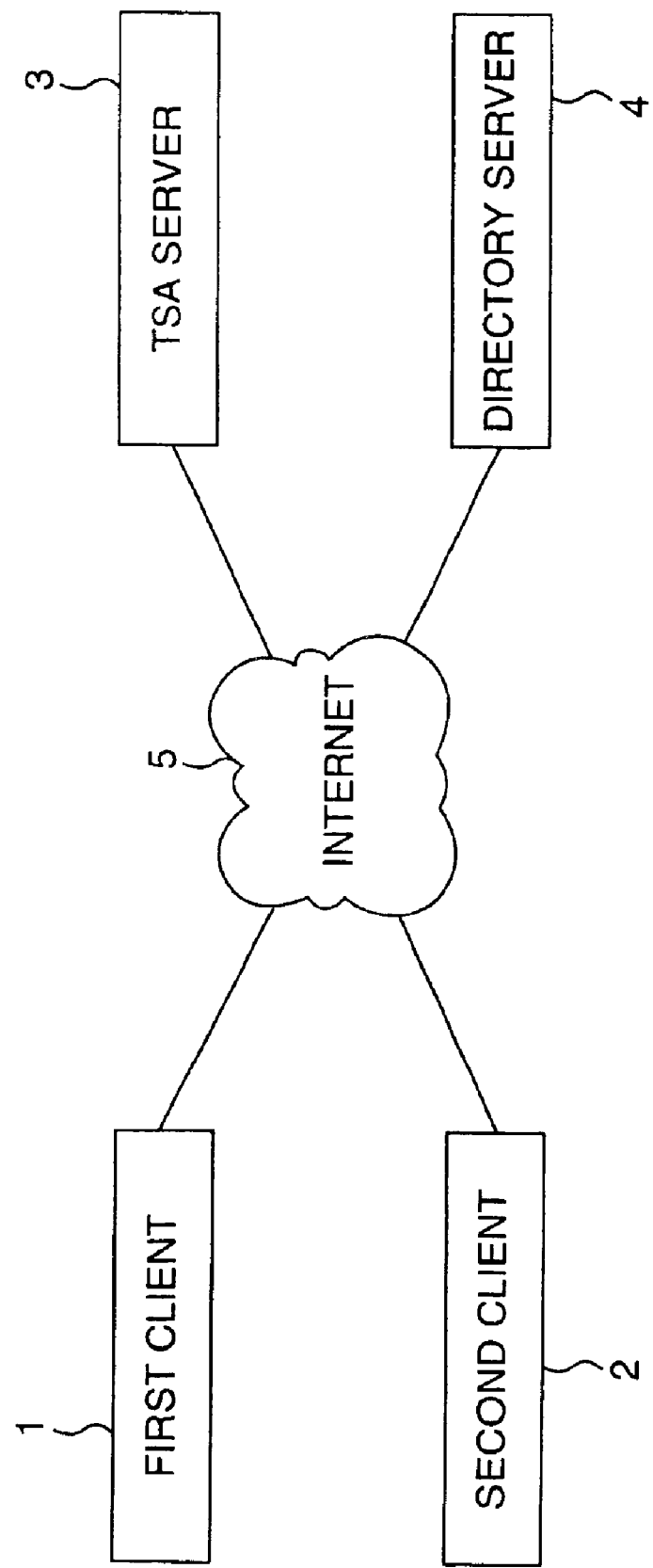
FIG. 1 is a block diagram showing a hardware architecture for execution of a method of providing a time stamping service for setting a client's system clock in accordance with the present invention.

With reference to FIG. 1, there is shown in block form a hardware architecture for execution of a method of providing a time stamping service for setting a client's system clock in accordance with the present invention. In this drawing, the reference numerals 1 and 2 denote first and second clients requesting time information, respectively. The first client 1 has a personal computer (PC) environment, and the second client 2 has a UNIX environment. A time stamp authority (TSA) server 3 is operable in a UNIX-based system to provide reliable time information. A directory server 4 is adapted to manage certificates for electronic signatures of the TSA server 3. This server 4 is one of unit systems for constructing a public key infrastructure, and manages certificates of all objects and a certificate revocation list. The Internet 5 is a fundamental communication network among the first and second clients 1 and 2, TSA server 3 and directory server 4, and is based on a transmission control protocol/Internet protocol (TCP/IP) network or a telephone accessing network such as a point-to-point protocol (PPP) network.

A description will hereinafter be given of the operation of the present invention under the above-stated hardware architecture with reference to FIGS. 2a to 2c.

Figure 2A:
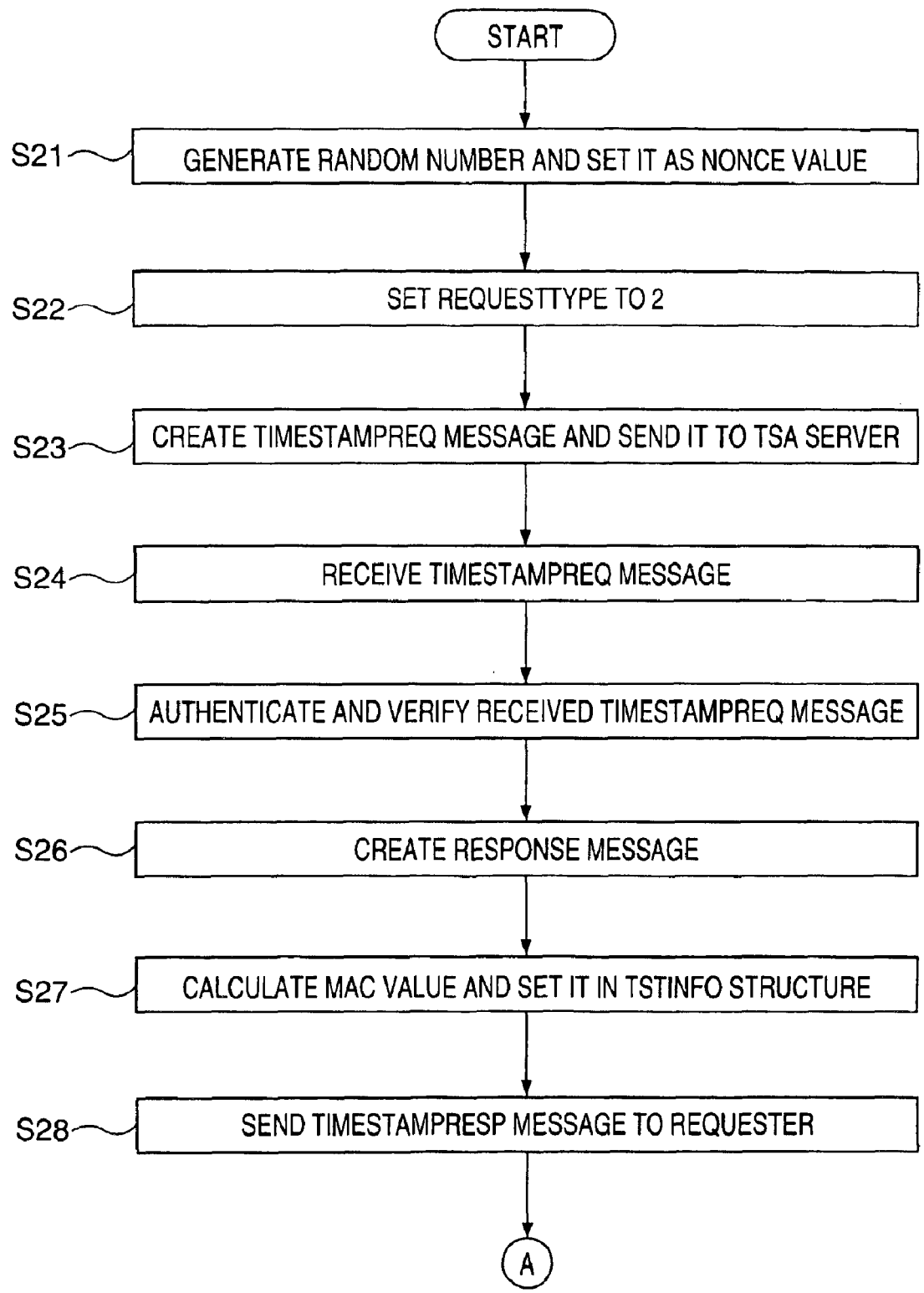
FIGS. 2a to 2c are flowcharts illustrating the method of providing the time stamping service for setting the client's system clock in accordance with the present invention.
Figure 2B:
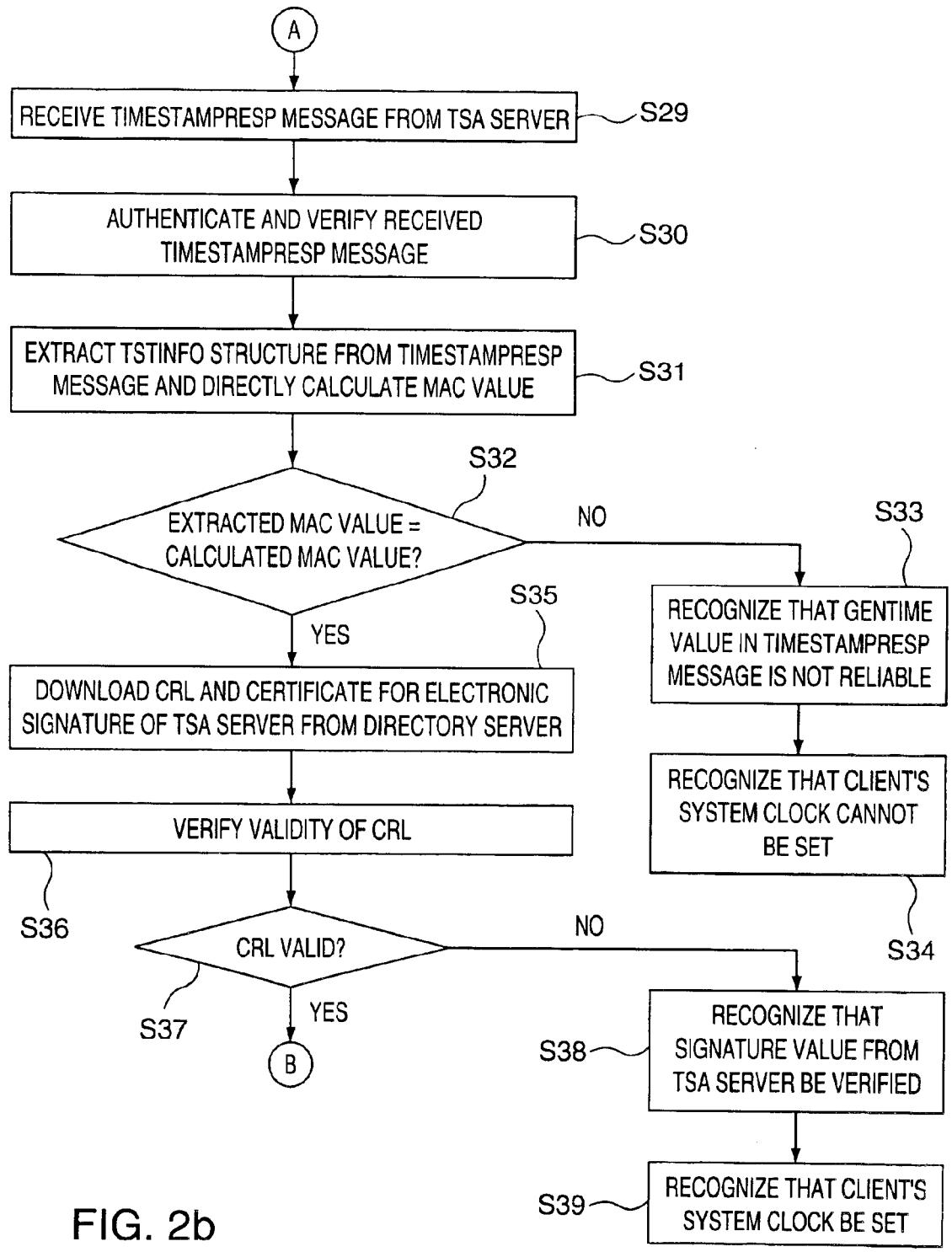
Figure 2C:
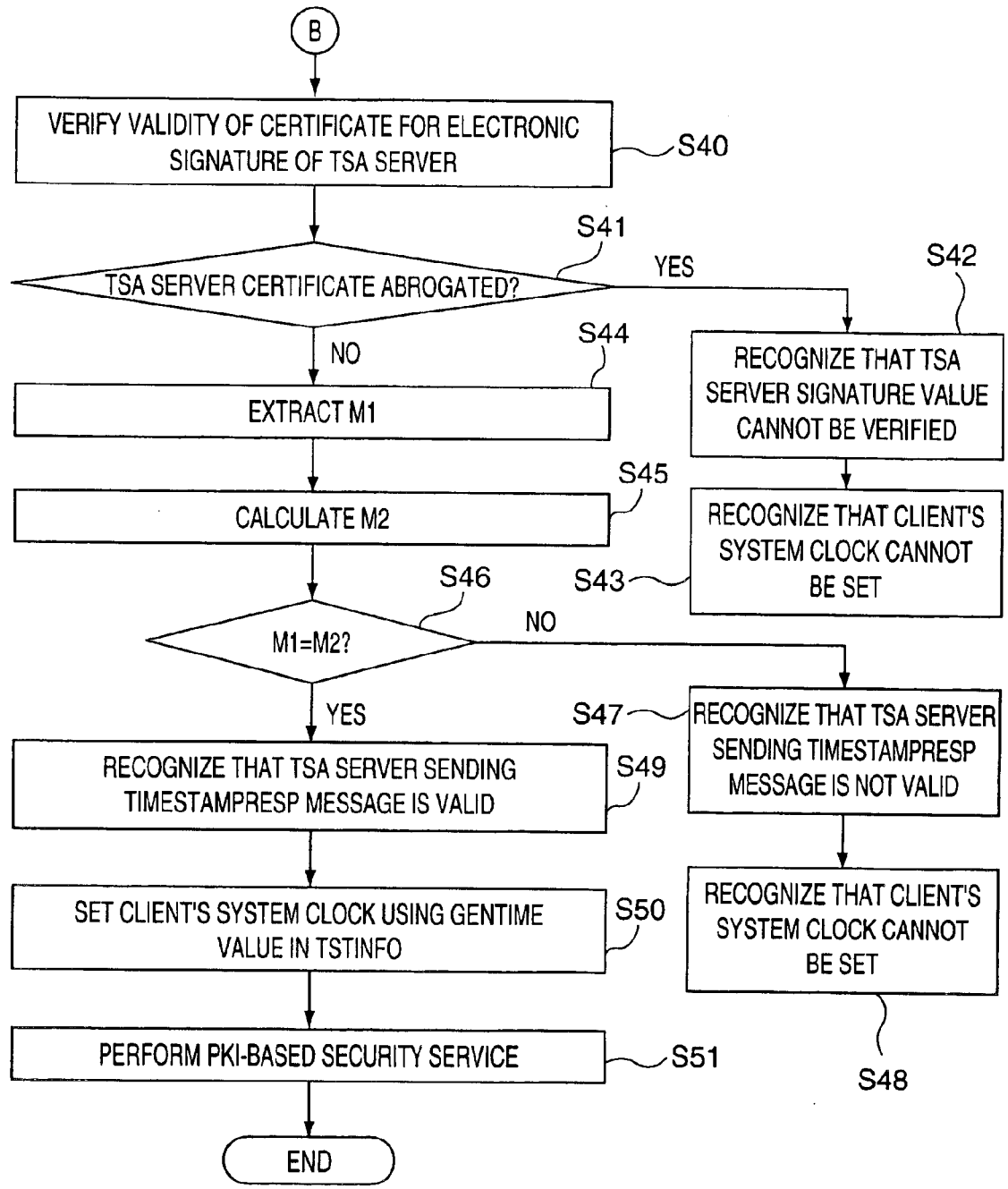

FIGS. 2a to 2c are flowcharts illustrating the method of providing the time stamping service for setting the client's system clock in accordance with the present invention. This method basically comprises five steps.

Namely, the present method comprises the first step of requesting the time stamping service of the TSA server 3 by a service requester, the second step of receiving the time stamping service request from the requester and creating and sending a response message corresponding thereto by the TSA server 3, the third step of receiving the response message sent from the TSA server 3 and verifying the integrity thereof by the requester, the fourth step of downloading a certificate revocation list from the directory server 4 and verifying the validity thereof by the requester, and the fifth step of downloading a certificate for an electronic signature of the TSA server 3 from the directory server 4, verifying an electronic signature value thereof and setting a system clock of the client 1 or 2 in accordance with the verified result by the requester.

The first step is composed of steps S21 to S23 in FIG. 2a.

At the first step, the requester first generates a random number with a given value and sets it as a nonce value of a service request message, or TimeStampReq message (S21).

In order to inform the time stamp authority server that the service request is for the setting of the client's system clock, the requester sets a requestType parameter of the TimeStampReq message, defined in the present invention, to 2, or a getBaseTime value, and adds the resulting structure to an extension field of the TimeStampReq message (S22).

Subsequently, the requester fills other parameters of the TimeStampReq message with given values and then sends the resulting TimeStampReq message to the TSA server 3 (S23).

The second step is composed of S24 to S28 in FIG. 2a.

Namely, the second step includes a sequence of steps processed by the TSA server 3. At the second step, the TSA server 3 first receives a service request message, or TimeStampReq message, sent from the requester (S24).

Then, the TSA server 3 authenticates and verifies the received TimeStampReq message (S25).

If there is an error at the above step S25, the TSA server 3 processes the received TimeStampReq message as an erroneous message, sends the processed result to the requester and ends the corresponding process.

However, if there is no error at the above step S25, the TSA server 3 fills parameters of the response message, or TimeStampResp message, with given values (S26).

In order to assure the integrity of the response message, the TSA server 3 extracts a TSTInfo structure from a TimeStampResp message structure created at the above step S26 and, in turn, current time information, or a genTime value, from the extracted TSTInfo structure, calculates a message authentication code (MAC) value on the basis of the extracted genTime value and a nonce value, set by the requester and contained in the TimeStampReq message, and then sets the calculated MAC value and identifier information of an algorithm used for the calculation of the MAC value respectively in corresponding fields of a MacInfo structure proposed in the present invention (S27).

Subsequently, the TSA server 3 adds the resulting MacInfo structure to an extension field of the TSTInfo structure and thus completes the creation of the TimeStampResp message structure proposed in the present invention.

Thereafter, the TSA server 3 sends the response message, or TimeStampResp message, created through the above steps to the requester (S28).

The third step is composed of S29 to S34 in FIG. 2b.

At the third step, the requester first receives the response message, or TimeStampResp message, sent from the TSA server 3 (S29) and authenticates and verifies the received response message (S30).

If there is an error such as an ASN.1 NOTATION error at the above step S30, the requester processes the received response message as an erroneous message.

If there is no error at the above step S30, the lower-order steps beginning with step S31 are performed. That is, the requester extracts a TSTInfo structure from the TimeStampResp message and directly calculates a MAC value to check the integrity of the TimeStampResp message (S31).

For the calculation of the MAC value at the above step S31, the requester first extracts current time information, or a genTime value, from the extracted TSTInfo structure and finds a nonce value, set by the requester and sent to the time stamp authority server.

The requester directly calculates a MAC value on the basis of the extracted genTime value and the found nonce value.

Then, the requester verifies the calculated MAC value to check whether the integrity of the received response message has been assured.

For the integrity verification, the requester first extracts a MacInfo structure proposed in the present invention from the TimeStampResp message sent from the time stamp authority server and, in turn, a MAC value from the extracted MacInfo structure and then compares the extracted MAC value with the MAC value calculated at the above step S31 to determine whether the two MAC values are equal (S32).

If the two MAC values are not equal at the above step S32, the requester recognizes that the current time information, or the genTime value, sent from the TSA server 3 was altered during the sending (S33) and the system clock of the client 1 or 2 cannot thus be set because the integrity of the received response message has not been assured. As a result, the requester processes the received response message as an erroneous message (S34).

To the contrary, in the case where the two MAC values are equal at the above step S32, the requester recognizes that the integrity of the received response message has been assured and thus performs the following fourth step.

The fourth step is composed of S35 to S37 in FIG. 2b.

At the fourth step, the requester first downloads the certificate revocation list (CRL) and the certificate for the electronic signature of the TSA server 3 from the directory server 4, which manages certificates of all objects and the certificate revocation list (S35).

In order to verify the validity of the certificate revocation list downloaded from the directory server 4 on the basis of a genTime value contained in the response message sent from the TSA server 3, the requester extracts time information set to thisUpdate and nextUpdate values from the certificate revocation list (S36).

Then, the requester determines whether the genTime value is present between the thisUpdate and nextUpdate values, so as to determine whether the certificate revocation list is valid (S37).

Upon determining at the above step S37 that the certificate revocation list is not valid, the requester recognizes that a signature value sent from the TSA server 3 (contained in a signature value field of a SignerInfo structure) cannot be verified (S38) and the system clock of the client 1 or 2 cannot thus be set. As a result, the requester performs an associated error process (S39).

However, if the CRL is valid at the above step S37, the requester proceeds to the fifth step.

The fifth step is composed of steps S40–S51 in FIG. 2c.

At the fifth step, the requester finally determines whether a genTime value sent from the TSA server 3 is reliable, by verifying a signature value sent from the TSA server 3.

First, in order to verify the validity of the certificate for the electronic signature of the TSA server 3, the requester extracts desired information (S40) from the certificate of the TSA server 3 and checks whether a serial number of the certificate of the TSA server 3 among the extracted information is present in the certificate revocation list (S41).

In the case where the serial number of the certificate of the TSA server 3 is present in the certificate revocation list at the above step S41, the requester recognizes that the signature value sent from the TSA server 3 cannot be verified and the system clock of the client 1 or 2 cannot thus be set, and then performs an associated error process (S42 and S43).

To the contrary, if the serial number of the certificate of the TSA server 3 is not present in the certificate revocation list at the above step S41, the requester performs a pre-process for the verification of the signature value sent from the TSA server 3.

Namely, the requester extracts a public key from the certificate for the electronic signature of the TSA server 3, downloaded from the directory server 4.

Then, the requester extracts the signature value from a SignerInfo structure of the TimeStampResp message, decodes the extracted signature value using the extracted public key and extracts a hash value (referred to hereinafter as M1), or a digest value, from the decoded result (S44).

Thereafter, the requester directly calculates a hash value (referred to hereinafter as M2) using a digest algorithm of the SignerInfo structure (S45).

Subsequently, the requester compares the two hash values, or M1 and M2, with each other to determine whether they are equal (S46). If M1 and M2 are not equal, the requester recognizes that the time stamp authority server sending the TimeStampResp message is not valid and the client's system clock cannot thus be set, and then performs an associated error process (S47 and S48).

However, if M1=M2, the requester recognizes that the TSA server 3 sending the TimeStampResp message is valid (S49).

Then, the requester sets the client's system clock on the basis of a genTime value extracted from the TimeStampResp message (S50) and then performs the subsequent service (S51).

Figure 3:
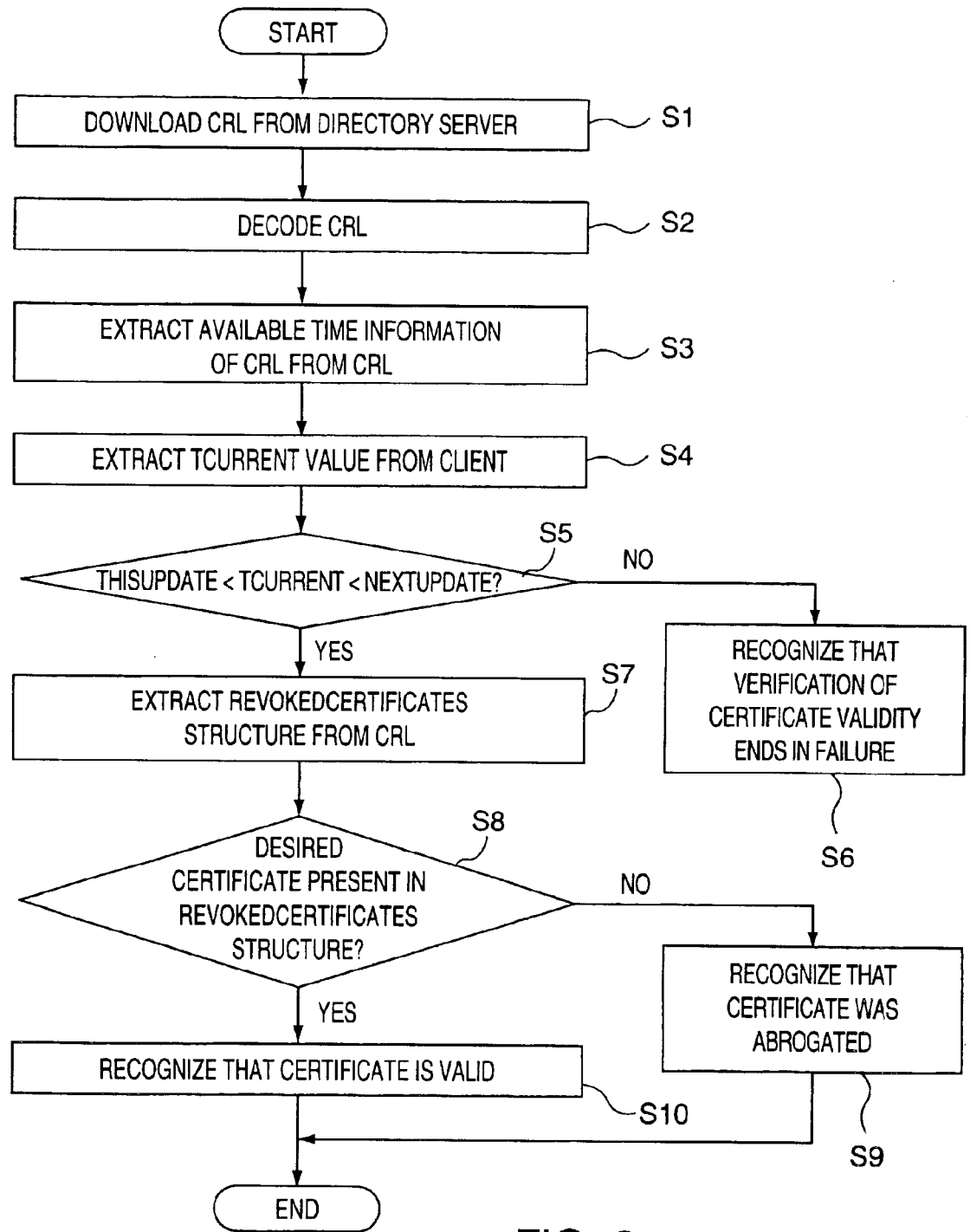
FIG. 3 is a flowchart illustrating a procedure of verifying the validity of a certificate revocation list in accordance with the present invention.

FIG. 3 is a flowchart illustrating a procedure of verifying the validity of a certificate revocation list in accordance with the present invention. Through a sequence of steps in FIG. 3, the PKI-based security service cannot be provided when the client's system clock is not accurately set. First, the requester downloads the CRL from the directory server 4 and decodes it (S1 and S2).

Then, the requester extracts available time information of the CRL from the CRL and current time information, or a Tcurrent value, from the client, respectively (S3 and S4).

Thereafter, the requester determines whether the Tcurrent value is present between thisUpdate and nextUpdate values, namely, thisUpdate<Tcurrent<nextUpdate (S5). If the Tcurrent value is not present between the thisUpdate and nextUpdate values, the requester recognizes that the verification of the certificate validity ends in failure (S6); otherwise, it extracts a revoked certificates structure from the CRL (S7). Then, the requester determines whether a desired certificate is present in the extracted revoked certificates structure (S8). If the desired certificate is not present in the extracted revoked certificates structure, the requester recognizes that it was abrogated (S9). However, in the case where the desired certificate is present in the extracted revoked certificates structure, the requester recognizes that it is valid (S10).

As apparent from the above description, the present invention provides a method which is effectively connected with a nonrepudiation service to objectively certify that a specific document has existed at a predetermined point of time. The present method provides a time stamping service for providing objectively reliable standard time information to a requester so that a client's system clock can be set on the basis of the standard time information. Therefore, the reliability and objectivity of the client's system clock can be assured.

Further, the present method is effectively connected with a public key infrastructure-based security service to overcome security service obstacles resulting from an inaccurate system clock of a client.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of providing a time stamping service for setting a client's system clock, comprising the steps of:
   a) requesting the time stamping service of a time stamp authority server (TSA) by a service requester based on combination of a time stamping request (TimeStampReq) service message set by a random number and a request message for setting the client's system clock;
   b) receiving the time stamping service request from said requester by said time stamp authority server (TSA), creating a message authentication code (MAC) based on combination of current time (genTime) information and the time stamping request (TimeStampReq) service message in response to the requesting, creating a response message by inserting a message certificate (Macinfo) structure including the message certificate (Macinfo) into a field of a time stamping response (TimeStampResp) message, and sending the response message;
   c) receiving the response message sent from said time stamp authority server by said requester, creating a message authentication code (MAC) by extracting the current time (genTime) information and the time stamping request (TimeStampReq) service message, which are included in the response message, and verifying the integrity of the response message by comparing the message authentication code (MAC) with another message authentication code (MAC) additionally included in the response message;
   d) downloading a certificate revocation list from a directory server by said requester, extracting the current time (genTime) information from the response message transmitted from the time stamp authority server (TSA), and verifying the validity of the certificate revocation list (CRL) by comparing the current time (genTime) information with time information set in the certificate revocation list (CRL); and
   e) downloading a certificate for an electronic signature of said time stamp authority server from said directory server by said requester, verifying validity of the time stamp response (TimeStampResp) service message, and, if the time stamp response (TimeStampResp) service message is valid, setting the client's system clock using the current time (genTime) information extracted from the response message.

2. The method as set forth in claim 1, wherein said step a) includes the steps of:

a-1) generating a random number with a given value and setting it as a nonce value of a service request message (TimeStampReq);

a-2) setting a requestType parameter of said TimeStampReq message to a getBaseTime value and adding the resulting structure to an extension field of said TimeStampReq message to inform said time stamp authority server that the service request is for the setting of said client's system clock; and a-3) filling other parameters of said TimeStampReq message with given values and sending the resulting TimeStampReq message to said time stamp authority server.

3. The method as set forth in claim 1, wherein said step b) includes the steps of:

b-1) receiving a service request message (TimeStampReq) sent from said requester and authenticating and verifying the received TimeStampReq message;

b-2) if there is an error at said step b-1), processing the received TimeStampReq message as an erroneous message, sending the processed result to said requester and ending the corresponding process;

b-3) if there is no error at said step b-1), filling parameters of the response message (TimeStampResp) with given values;

b-4) extracting a TSTInfo structure from a TimeStampResp message structure created at said b-3) and, in turn, current time information (a genTime value) from the extracted TSTInfo structure, calculating a message authentication code (MAC) value on the basis of the extracted genTime value and a nonce value, set by said requester and contained in said TimeStampReq message, and setting the calculated MAC value and identifier information of an algorithm used for the calculation of the MAC value respectively in corresponding fields of a Macinfo structure to assure the integrity of said response message;

b-5) adding the resulting Macinfo structure to an extension field of said TSTInfo structure and thus completing the creation of said TimeStampResp message structure; and b-6) sending the completed response message (TimeStampResp) to said requester.

4. The method as set forth in claim 1, wherein said step c) includes the steps of:

c-1) receiving the response message (TimeStampResp) sent from said time stamp authority server and authenticating and verifying the received response message;

c-2) extracting a TSTInfo structure from said TimeStampResp message and, in turn, current time information (a genTime value) from the extracted TSTInfo structure, finding a nonce value, set by said requester and sent to said time stamp authority server, and directly calculating a message authentication code (MAC) value on the basis of the extracted genTime value and the found nonce value to check the integrity of said TimeStampResp message;

c-3) extracting a MacInfo structure from said TimeStampResp message sent from said time stamp authority server and, in turn, a MAC value from the extracted MacInfo structure and comparing the extracted MAC value with said MAC value calculated at said step c-2) to determine whether the two MAC values are equal; and c-4) if said two MAC values are not equal, recognizing that the current time information (genTime value) sent from said time stamp authority server was altered during the sending and said client's system clock cannot thus be set and then processing the received response message as an erroneous message, and if said two MAC values are equal, recognizing that the integrity of the received response message has been assured.

5. The method as set forth in claim 1, wherein said step d) includes the steps of:

d-1) downloading said certificate revocation list and said certificate for the electronic signature of said time stamp authority server from said directory server managing certificates of all objects and said certificate revocation list;

d-2) extracting time information set to thisUpdate and nextupdate values from said certificate revocation list downloaded from said directory server, so as to verify the validity of said certificate revocation list on the basis of a genTime value contained in the response message sent from said time stamp authority server; and d-3) determining whether said genTime value is present between said thisUpdate and nextupdate values, so as to determine whether said certificate revocation list is valid, and if said certificate revocation list is not valid, recognizing that a signature value sent from said time stamp authority server cannot be verified and said client's system clock cannot thus be set and then performing an associated error process.

6. The method as set forth in claim 1, wherein said step e) includes the steps of:

e-1) extracting desired information from said certificate for the electronic signature of said time stamp authority server and checking whether a serial number of said certificate of said time stamp authority server among the extracted information is present in said certificate revocation list, so as to verify the validity of said certificate;

e-2) if the serial number of said certificate of said time stamp authority server is present in said certificate revocation list, recognizing that said client's system clock cannot be set and then performing an associated error process;

e-3) extracting a public key from said certificate of said time stamp authority server if the serial number of said certificate is not present in said certificate revocation list;

e-4) extracting a signature value from a SignerInfo structure of said TimeStampResp message, decoding the extracted signature value using the extracted public key, extracting a first hash value from the decoded result and directly calculating a second hash value using a digest algorithm of said SignerInfo structure;

e-5) comparing said first and second hash values with each other to determine whether they are equal, if said first and second hash values are not equal, recognizing that said time stamp authority server sending said TimeStampResp message is not valid and then performing an associated error process, and if said first and second hash values are equal, recognizing that said time stamp authority server sending said TimeStampResp message is valid; and e-6) setting said client's system clock on the basis of a genTime value extracted from said TimeStampResp message.

* * * * *